Oct. 23, 1928.  
F. S. DICKINSON  
STRIP FOR CORD TIRES  
Filed July 7, 1922  
1,689,168
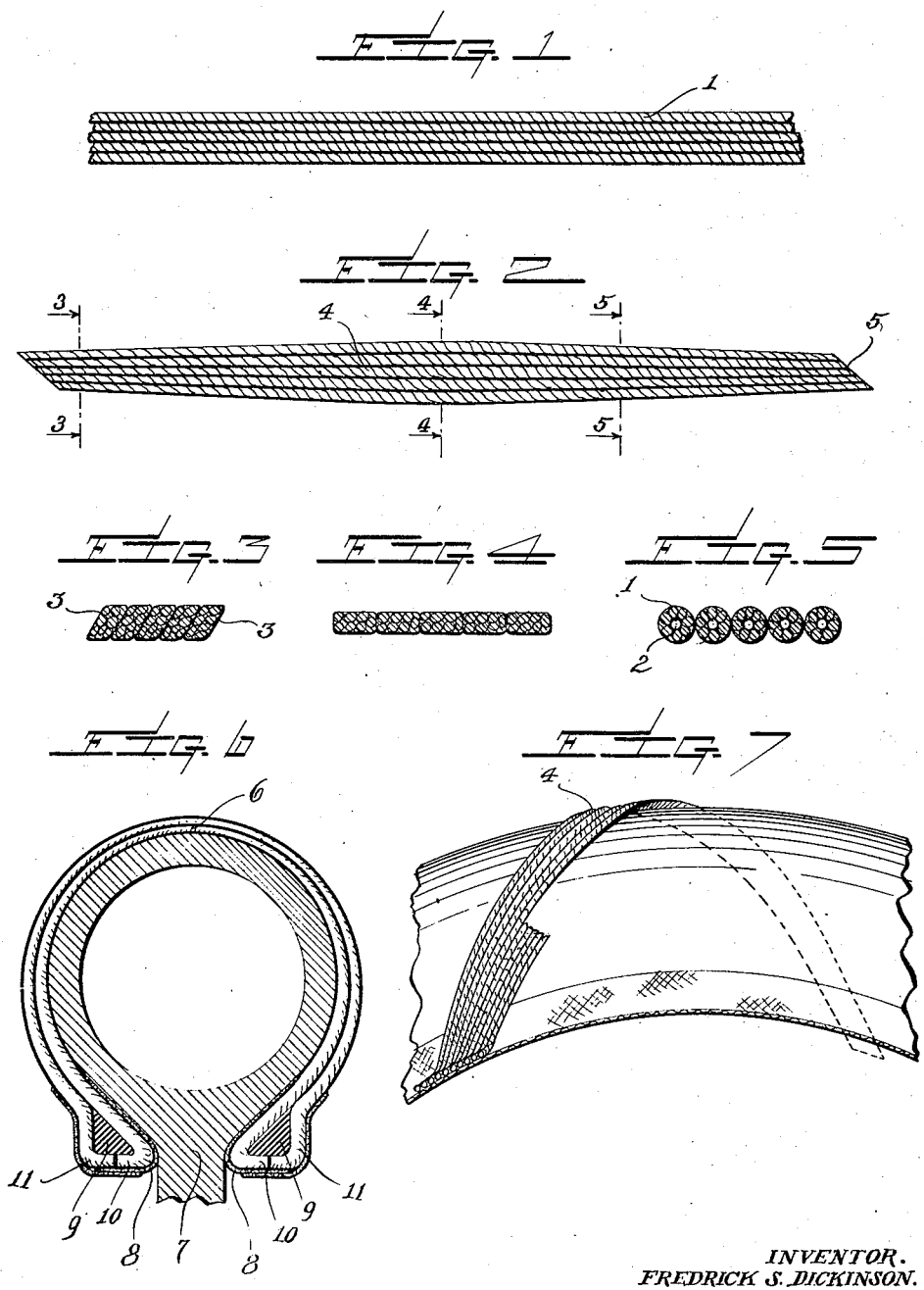
INVENTOR.  
FREDRICK S. DICKINSON.  
BY  
ATTORNEY.

Patented Oct. 23, 1928.

1,689,168

UNITED STATES PATENT OFFICE.

FREDRICK S. DICKINSON, OF NEW YORK, N. Y.

STRIP FOR CORD TIRES.

Application filed July 7, 1922. Serial No. 573,460.

This invention relates to the construction of pneumatic tires for vehicles, and more particularly to inflatable tires of the so-called "cord" construction.

Pneumatic tires of the kind above referred to are constructed by providing a carcass, the outlines of which correspond to a horseshoe and this carcass is built up with reinforcing elements to withstand the pressure of the inflated inner tube, together with a tread ordinarily of rubber or similar resilient material which is to come in contact with the ground. In constructing this carcass, it has previously been customary in the construction of a so-called cord tire, to provide individual cords which are laid about a hollow mandrel angularly of the periphery thereof, these cords being secured by any suitable means at the edges or beads of the carcass. These cords may be laid in place on a mandrel either individually or in groups, but there is an inherent difficulty in employing such cords for the construction of a shoe owing to the fact that the area to be covered by the cords varies from bead to bead across the tread. Inasmuch as the diameter of the shoe is less at the beads than at the tread, obviously when the cords are laid side by side so as to be in contact with each other at the bead, such a cord layer will not completely cover the tread surface, which lies at a greater distance from the center of the shoe. If a suitable number of cords are provided to cover the tread surface completely, these cords will be in excess of the required number so far as the area to be covered is concerned, at the bead.

One of the advantages of cord tires lies in the elimination of internal friction, which is always present, to some extent, due to the yielding of the tire as it moves over the irregularities of the road. Once, however, some means is provided by which the cords may completely cover the area of the shoe without lapping or gapping, the advantages of a cord tire construction are attained without any of the disadvantages.

One of the objects of this invention is to provide a reinforcing element formed of a plurality of cords, the cords being so distorted in the process by which the element is formed that the element will have a varying transverse dimension permitting it to exactly cover its proportional part of the tire tread.

Another object of the invention is to provide a reinforcing element for the construction of cord tires by means of which a plurality of cords may be incorporated as a unit into the tire structure, this unit having a varying area so as to permit it to exactly cover its proportional part of the tire tread.

Another object of the invention is to provide a reinforcing element for cord tire construction composed of a plurality of cords combined into a unit while being maintained in a plane, the cords being so distorted during the combining process as to provide an element having transverse dimensions varying in accordance with the area to be covered by such strip.

Another object of the invention is to provide a strip serving as a reinforcing element for cord tires and composed of a plurality of cords united into a single element while being maintained in a plane and while all the cords are being held under a uniform tension, whereby each one will assume its proportional part of the load when disposed in position within the tire structure.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings, wherein I have shown a preferred form of embodiment of my invention:

Figure 1 shows a top plan view of a plurality of cords which are to be formed into reinforcing elements.

Figure 2 shows a top plan view of the completed reinforcing element.

Figures 3, 4 and 5 are cross-sectional views of the finished element taken on the lines 3—3, 4—4 and 5—5 of Figure 2.

Figure 6 is a view in cross-section showing a double layer of the reinforcing elements disposed in position about the tire mandrel.

Figure 7 is a detailed view in side elevation of a tire mandrel showing the manner in which the elements are to be laid.

With reference now to the drawings in which similar reference characters refer to similar parts throughout the views thereof, the reference character 1 designates a single cord of which a plurality are to be used in the formation of the element. It will be noted, on reference to Figure 5, that the cords to be employed for this purpose are constructed of a number of strands, and preferably formed with a hollow center as indicated by the reference character 2. I have found that the distorting process to which the cords are subjected in being combined into a reinforcing element, will work most satisfactorily with hollow cords, although such cord form is not necessary, provided, in the case of solid cords, that the strands are somewhat more loosely twisted so as to permit of the distortion in the manner later to be described.

These cords are introduced from spools or bobbins into a forming apparatus, by means of which they are united into a single unitary construction and distorted in such uniting process. This step may be carried on in the cord tire machine illustrated and described in my application for United States Letters Patent filed April 17, 1922, Serial No. 553,487, or by similar devices.

The cords are to be combined into the element while being maintained under a uniform tension and this tensioning operation may be carried out in a number of different ways as, for instance, by the provision of floating weights which are supported by the cords which are to be led into the forming apparatus. In such apparatus, the cords are subjected to pressure, suitable dies being provided to give the strip its desired form. Inasmuch as the cords are to be used in the construction of a rubber treaded tire, I have found it possible and, in fact, desirable, to impregnate the cords prior to the application of the pressure of the dies, and I use for this purpose raw rubber in the gummy form. Upon the application of pressure, the cords which have a sticky surface due to the impregnated material, will be forced into intimate contact and held in such position by the rubber.

In the combining step, which depends on pressure, as has been set forth, the element produced will have recurring variations in width and thickness, such variations being clearly shown in Figures 2 to 5, inclusive. At the middle point of the element, as shown on the lines 4—4, Figure 4, the cords will be flattened so as to give the finished element a greater width than the combined widths of the unpressed cords. At the ends, as for instance on the line 3—3, the cords will be pressed so as to constrict the width and increase the thickness of the element, the edges of the element being bevelled as indicated at 3, 3, Figure 3, at the constricted portions.

The combining process will be, preferably, a continuous operation and there results therefrom a unitary strip of indefinite length in which there are recurring variations in the transverse dimensions; that is to say, in the width and thickness. Inasmuch as the reinforcing elements are to be laid angularly about the hollow mandrel on which the shoe is to be formed, as indicated in Figure 7, the indvidual elements designated as 4 will be cut from the strip and will be given a length which is determined by the size of the shoe. Furthermore, the ends of the reinforcing elements will be cut off at an angle, as is indicated in Figure 2 at 5.

The strips, formed in accordance with the method described, and having the shape shown in Figure 2, are then to be laid about the hollow mandrel in the angular position. This laying operation will be carried on in any desired manner, either manually or mechanically, and in the laying operation, the point of greatest flattening of the cords will correspond with the outermost point on the tread surface, this point being indicated in general at 6 in Figure 6. It will thus be seen that that area of the tread which is greatest will be covered by the greatest width of the strips and the strips are so formed that the diminishing width from the middle point to the ends will correspond to the diminishing area which the elements are to cover.

In the construction of the carcass employing the elements described for reinforcing purposes, there is placed a layer of soft unvulcanized rubber on the hollow mandrel 7. Along the edges of the bead there are placed protective strips 8, 8, these strips being made of fabric suitably treated. The individual reinforcing elements are then laid in the manner described about the mandrel, being held taut during the laying process. The tension placed on the elements will be maintained after the units have been laid by reason of the elements adhering to the sticky surface of the rubber layer. The elements are forced in about the edges of the tread in the manner shown in Figure 6, and there are then placed in position the stiffening rings 9, 9 which form the basis of the bead construction.

The ends of the elements are then bent outwardly under the lower edge of the rings as at 10, 10, these ends being cut off at an angle, as has previously been set forth. As has been explained, the end portions of the elements are bevelled, as indicated at 3, 3 in Figure 3, and the purpose of this bevelling is to insure that the elements will adjust themselves into intimately contacting position during the laying process, the bevels permitting this close contact without special precautions being taken.

When the mandrel has been completely covered with a layer of reinforcing element laid in accordance with the above described process, a second sheet of unvulcanized rubber is laid thereover, whereupon a second layer of reinforcing elements will be placed in position. The second layer of reinforcing elements will be positioned with the elements at the opposite angle from those in the first layer and the ends will be forced about the reinforcing ring as indicated at 11. The strips are so laid that the ends of the outer layer will fit closely with the angularly cut ends of the inner layer so that the elements of both the layers will form a smooth surface about the reinforcing rings at the beads.

When the reinforcing structure composed of the two layers of elements has been completed, a breaker strip and the usual rubber tread will be applied thereto, whereupon the hollow structure may be vulcanized in the usual manner. The details of the final formation of the tire are not of importance in this connection since the tire may be formed in many ways with treads of any desired form.

I have shown a reinforcing structure composed of two layers of reinforcing elements laid side by side. It is obvious, however, that this construction is not limited to two layers, although I have found that such a construction is sufficiently strong for all ordinary purposes. The cords which form the component parts of the reinforcing elements will be separated from each other by thin films of rubber due to the impregnation process, and inasmuch as the cords have been combined together while maintained at a uniform tension, it is assured that each cord will assume its proportional part of the load; that is to say, withstanding the pressure of the inflated inner tube. Furthermore, each individual cord is separated from all the others by rubber layers and this prevents any rubbing which would result in friction and eventually, in blow-outs.

It will, accordingly, be seen that I have provided a structural element for cord tires which is well adapted to attain the several aims and purposes previously set forth. These reinforcing elements may be constructed in a number of ways, provided the main objects are achieved, the essential purpose of this invention being to provide an element which is pre-formed so as to compensate for the variations in area of the surface which it is to cover.

It will be seen that the element here set forth accomplishes this purpose and the cords which are united to form the element are distorted as to their normal contour so that the surface of the mandrel will be completely covered without there resulting any gapping at the tread nor overlapping at the beads. By uniting the cords while maintaining a uniform tension thereon, the element is equally strong in all parts and the load will be distributed evenly throughout. Furthermore, the elements are preferably to be laid under uniform conditions of tension so that all parts of the reinforcing layer will evenly assume the load. Under such conditions there is no tendency for the various elements to move relatively to one another and this eliminates the possibility of tearing the internal structure of the carcass and also prevents friction and undue wear caused by rubbing.

By way of definition, it may be said that the terms "distort" and "distortion" as used in the specification and claims refer to the process by which the individual cords are given such a form as is necessary to compensate for the variations in the areas on the mandrel which are to be covered by the cords. In the process, the normal cross-sectional contour of the individual cords is changed by causing the strands forming the cords to be moved transversely relatively to one another to positions other than those normally occupied, the result being attained without, however, causing internal strains, lessening the strength of the cord, or varying the relative tension of the individual strands. This definition applies whether the cords are laid individually or in composite strips.

As many changes could be made in this construction without departing from the scope of the following claims, it is intended that all matter contained in the above description or shown in the accompanying drawing shall be interpreted as illustrative only and not in a limiting sense.

Having thus described my invention, what I claim as new and desire to secure by Letters Patent is:

1. As an article of manufacture, a strip having its end portions transversely expanded in one direction and a portion intermediate its ends transversely expanded at angle to said direction.

2. As an article of manufacture, a strip having its end portions of substantially similar dimensions and its intermediate portion of progressively varying transverse dimensions.

3. As an article of manufacture, a strip composed of a plurality of cords lying side by side and so united as to give said strip a progressively varying transverse dimension.

4. As an article of manufacture, a strip composed of a plurality of cords lying side by side and so united as to give said strip a transverse dimension varying progressively from a minimum at the end portions thereof through a maximum at its intermediate portion.

5. As an article of manufacture, a strip composed of a plurality of cords lying side by side and so united as to give said strip end portions of restricted width and an intermediate portion of progressively varying width.

6. As an article of manufacture, a strip composed of a plurality of cords combined while maintained in a plane, the transverse dimensions of said cords being so varied in said combining operations as to give said strip a transverse dimension progressively varying intermediate its length from a minimum through a maximum to a second minimum.

7. A reinforcing member for tire carcasses consisting of a plurality of cords lying side by side and so combined as to produce a strip having recurring variations in width.

8. A reinforcing member for a tire carcass consisting of a plurality of cords, each of which is distorted in a plurality of planes.

9. A reinforcing member for a tire carcass comprising a plurality of cords, lying side by side, said cords having their normal form changed so that the reinforcing member is wider at its intermediate portion than it is at its ends.

10. A reinforcing member for a tire consisting of a plurality of cords lying side by side, each cord being dimensionally distorted in different planes.

11. A reinforcing member for a tire consisting of a plurality of cords lying side by side, each cord being dimensionally distorted in different planes, said planes being substantially at right angles to each other.

12. A device of the class described adapted to form a part of a reinforcing layer of a tire carcass consisting of a plurality of cords lying side by side, said device being flattened at its intermediate portion and thickened at its end portions.

In testimony whereof, I affix my signature.

FREDRICK S. DICKINSON.